Jan. 18, 1955 H. MAYER ET AL 2,699,928

VAPORIZER FOR LIQUIDS

Filed July 24, 1951 7 Sheets-Sheet 1

Inventors
Hans Mayer, Erich Jaschinsky
Gottfried Neuerburg and Emil Lerp

By: Michael S. Striker
Att.

Inventors
Hans Mayer, Erich Jaschinsky
Gottfried Neuerburg and Emil Lerp
By [signature]

VAPORIZER FOR LIQUIDS

Filed July 24, 1951 7 Sheets-Sheet 3

Inventors
Hans Mayer, Erich Jaschinsky
Gottfried Neuerburg and Emil Lerp
By: [signature]

VAPORIZER FOR LIQUIDS

Filed July 24, 1951 7 Sheets-Sheet 4

Inventors:
Hans Mayer, Erich Jaschinsky
Gottfried Neiderburg and Emil Lerp
By: Michael S. Striker Jan. 18, 1955 H. MAYER ET AL 2,699,928

VAPORIZER FOR LIQUIDS

Filed July 24, 1951 7 Sheets-Sheet 5

Inventors
Hans Mayer, Erich Jaschinsky
Gottfried Neuerburg and Emil Lerp
By: Michael

VAPORIZER FOR LIQUIDS

Filed July 24, 1951 7 Sheets-Sheet 6

Inventors
Hans Mayer, Erich Jaschinsky
Gottfried Neuerburg and Emil Lerfe
By:

Inventors
Hans Mayer, Erich Jaschinsky
Gottfried Neuerburg and Emil Lerk
By: [signature]

United States Patent Office 2,699,928

Patented Jan. 18, 1955

2,699,928

VAPORIZER FOR LIQUIDS

Hans Mayer, Baden-Baden, Erich Jaschinsky, Pinneberg, near Hamburg, Gottfried Neuerburg, Hamburg-Hochkamp, and Emil Lerp, Hamburg-Blankenese, Germany, assignors to Vergaserbau Hamburg G. Neuerburg & Co., Hamburg-Wandsbek, Germany, a firm Application July 24, 1951, Serial No. 238,208

Claims priority, application Germany January 19, 1951

23 Claims. (Cl. 261—69)

Figure 1:
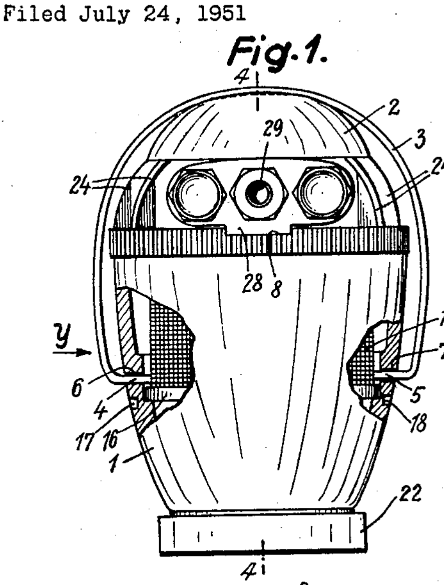

The invention relates to improvements in carburetters for the vaporisation of gasoline, and suitable for use with internal combustion engines.

An object of this invention is to provide a carburetter which will be wholly smooth in operation, from the position of rest, that is to say when it is not in operation, through an idling position to a position of full gas output.

Another object of the invention is to provide a carburetter which is not dependent on the action of a float, and therefore can operate in any position.

A further object of the invention is to provide a carburetter which gives the above-mentioned smooth continuous increase in output without special devices for starting or idling conditions of the engine to which it is fitted.

The invention will be described with reference to the accompanying drawings which illustrate, by way of example, various forms of construction.

Figure 2:
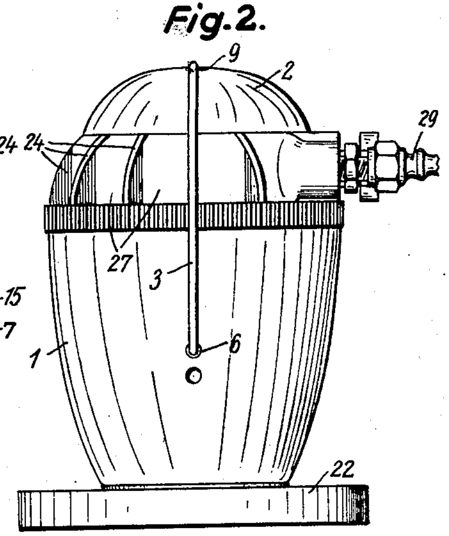
Figures 3, 4, 5:
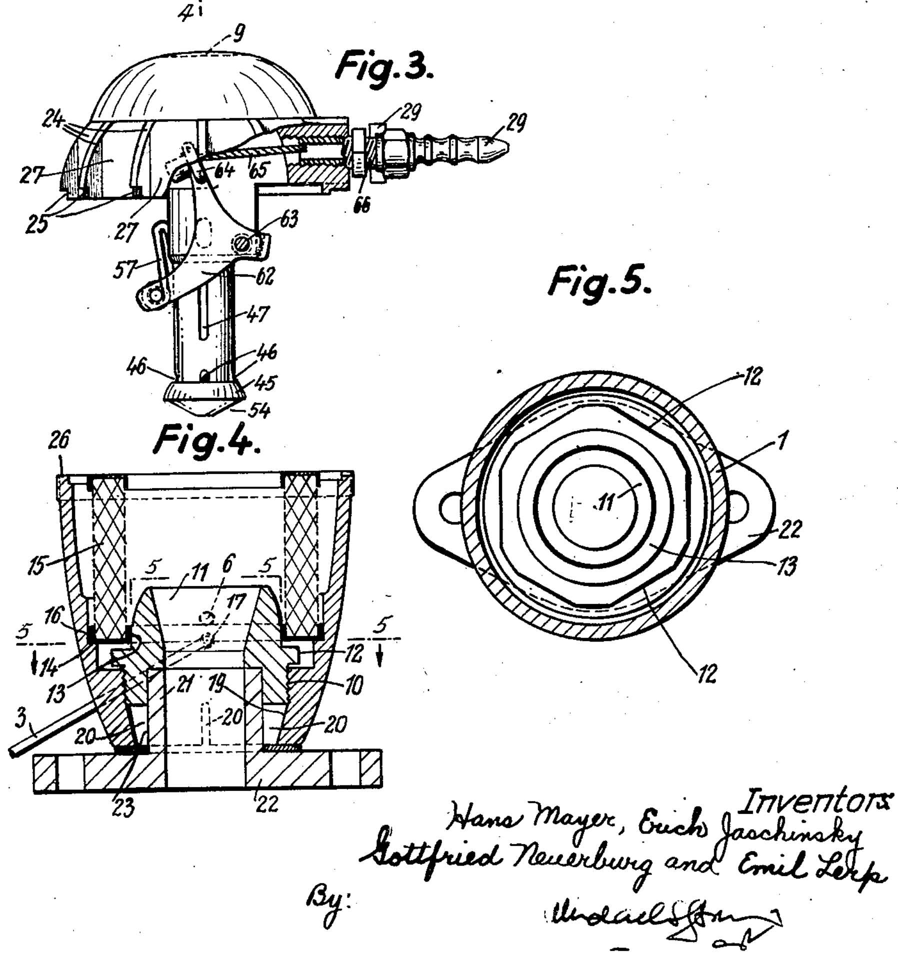
Figure 6:
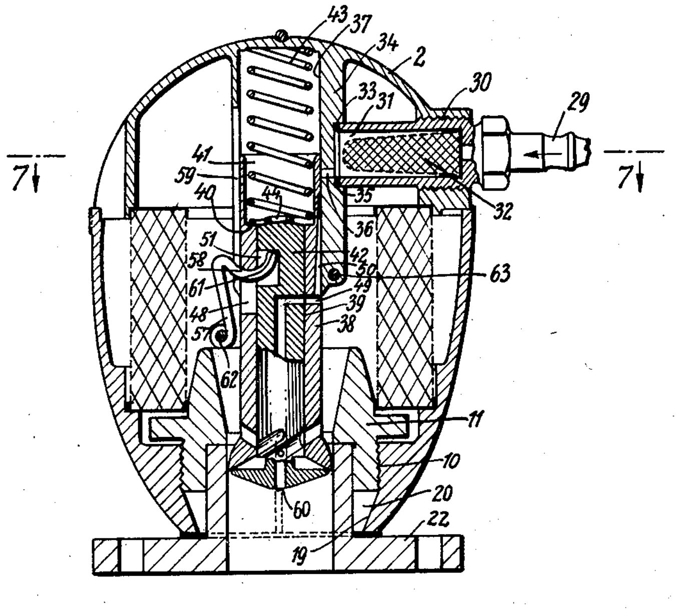
Figure 7:
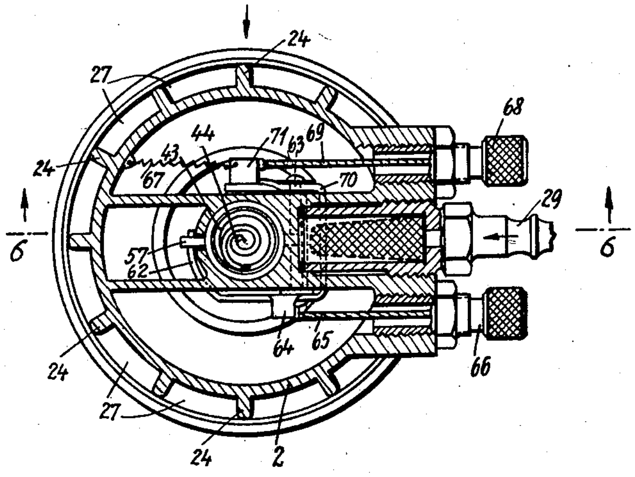
Figure 8:
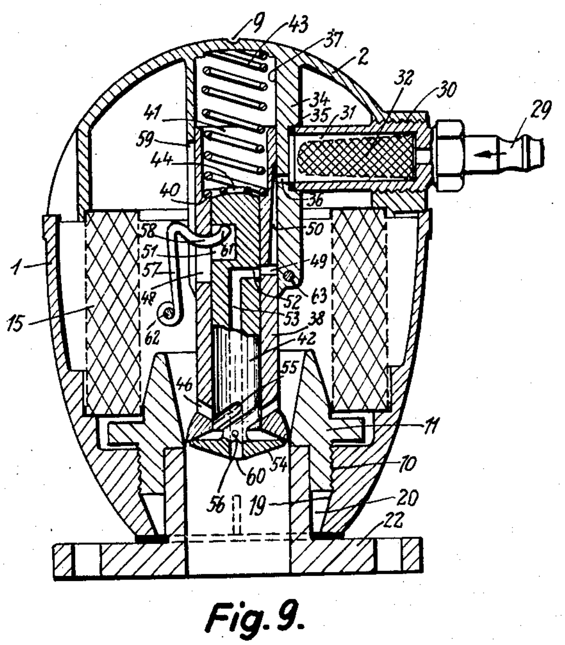
Figure 9:
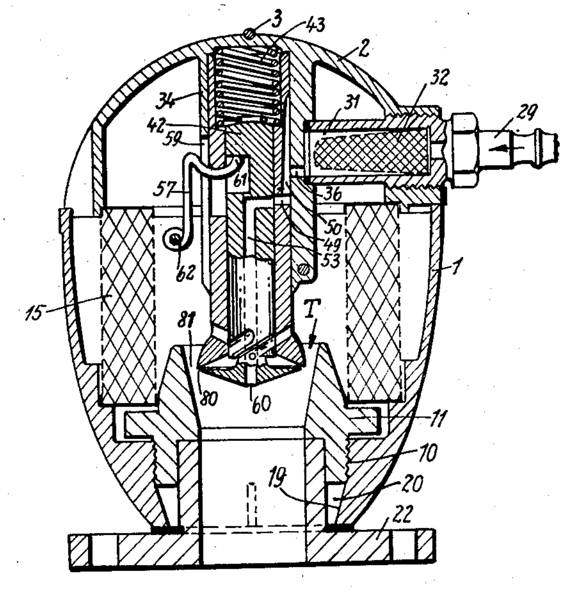
Figure 10:
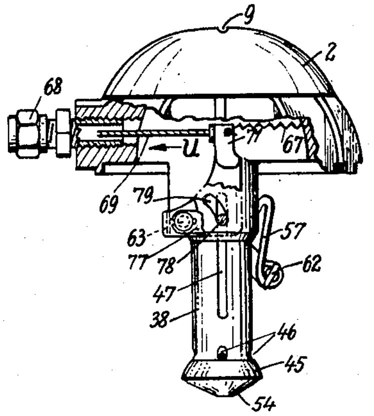
Figure 12:
Figure 11:
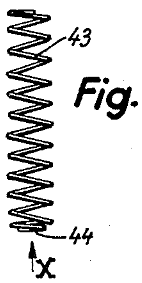
Figures 15, 16:
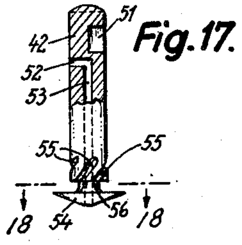
Figures 13, 14:
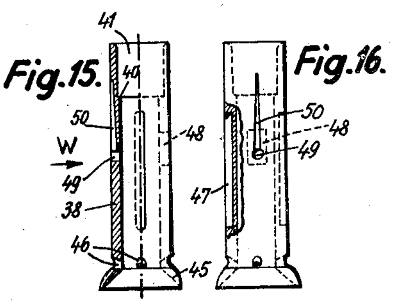
Figure 17:
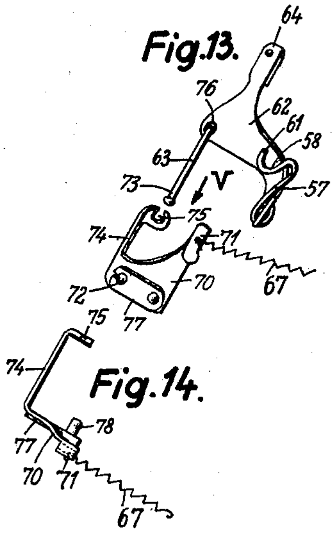
Figure 18:
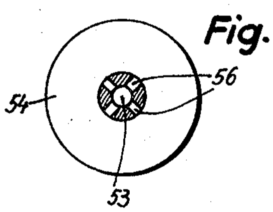
Figure 19:
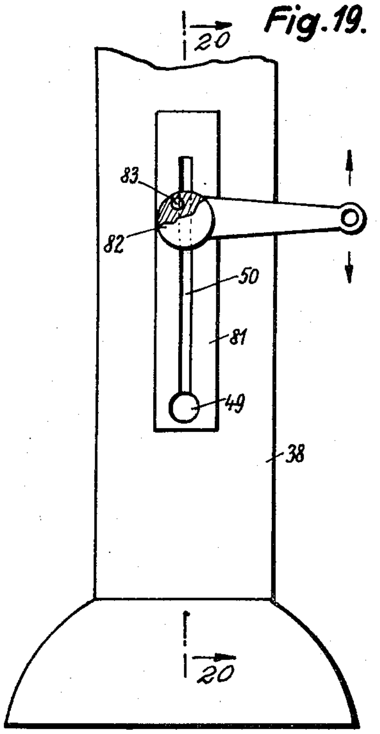
Figure 20:
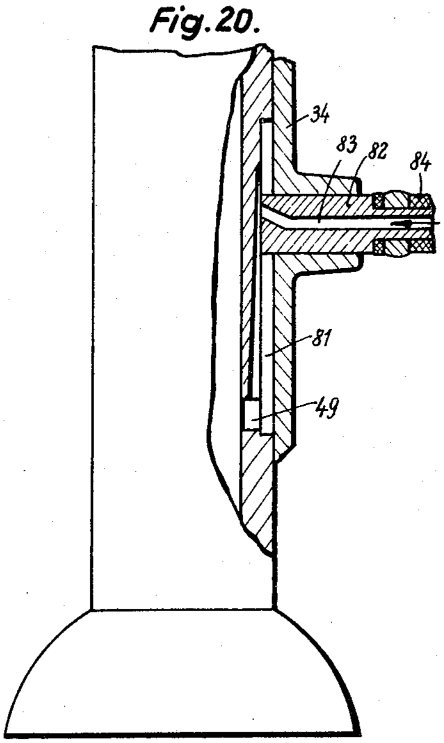
Figure 21:
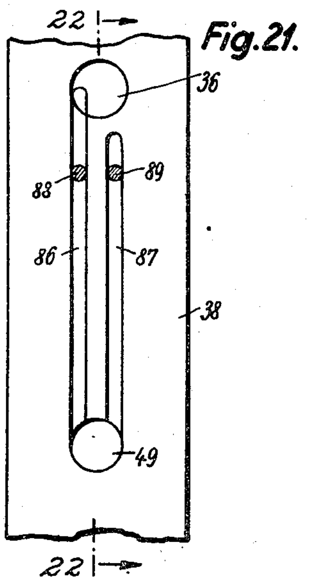
Figure 22:
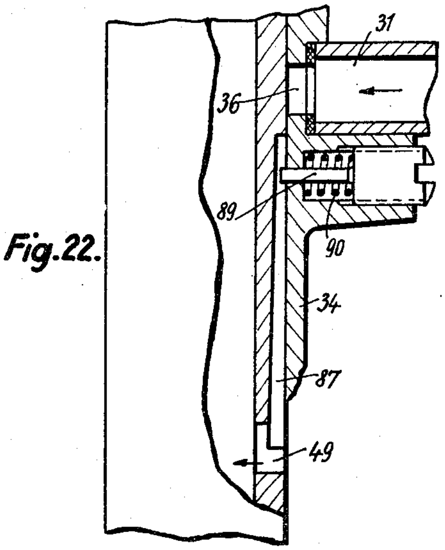
Figures 23, 24:
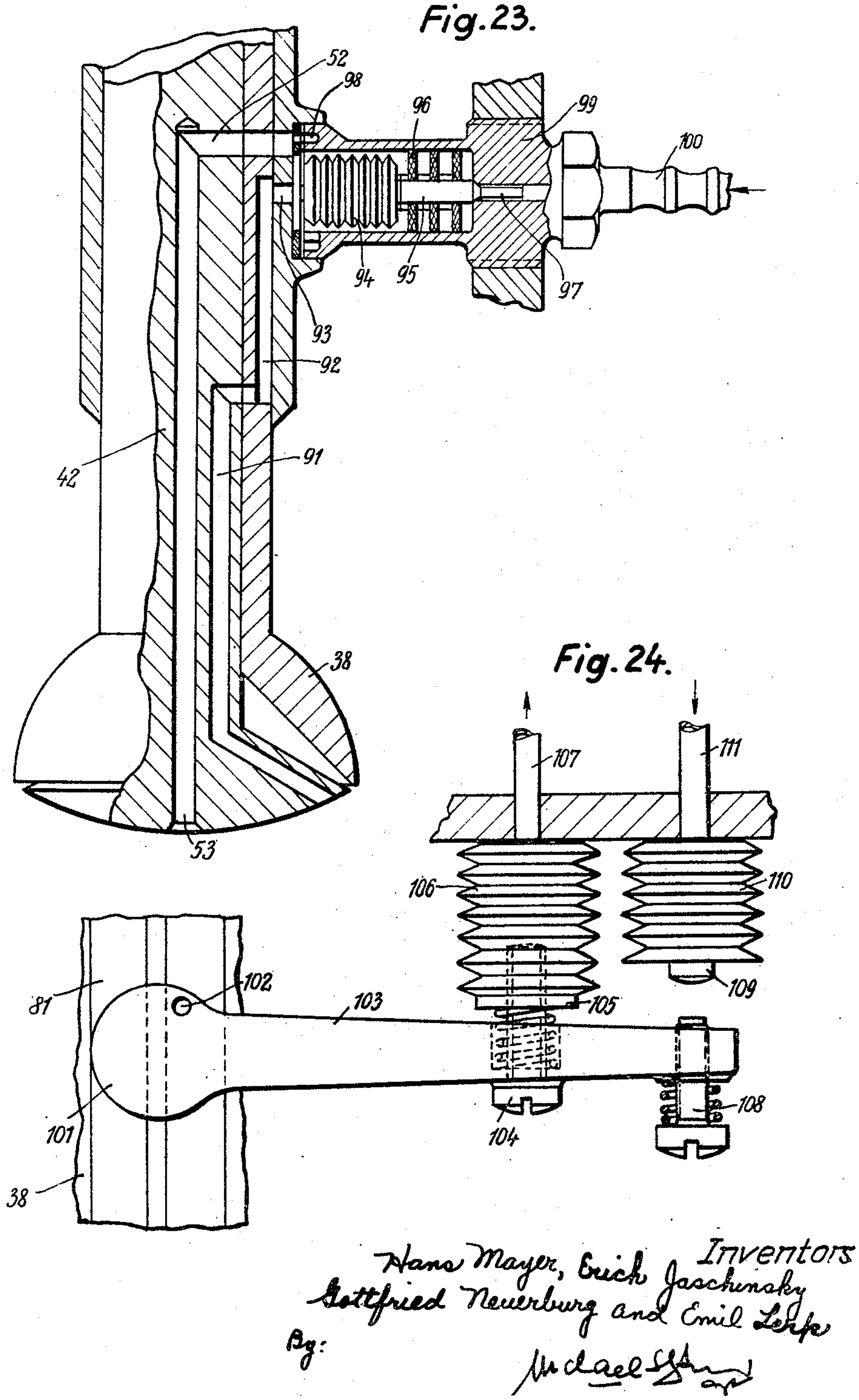
Figure 25:
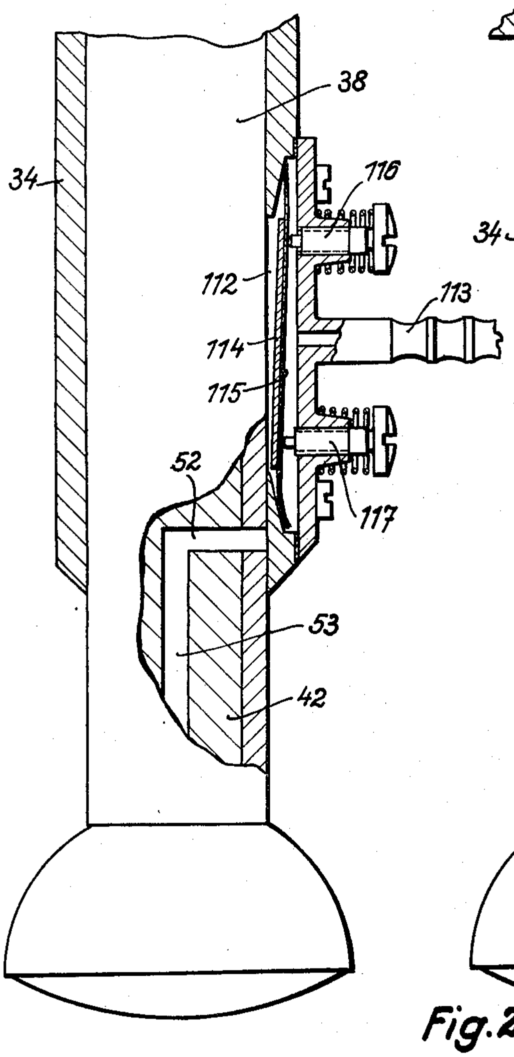
Figure 26:
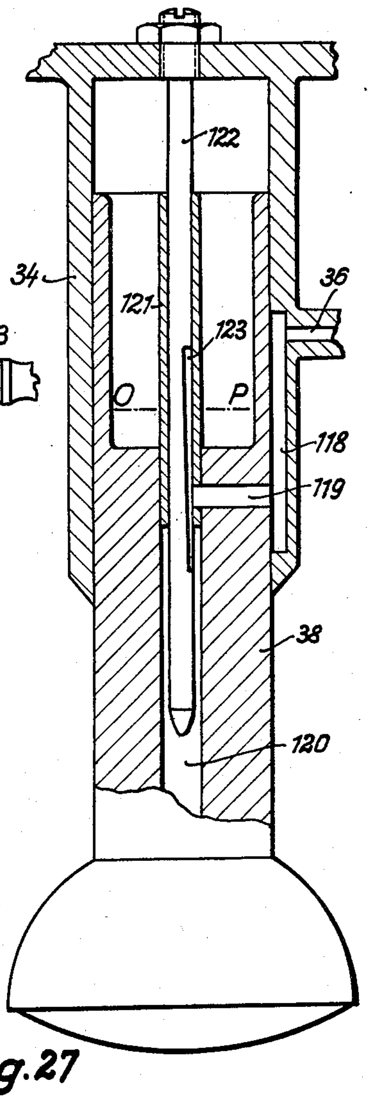
Figure 27:
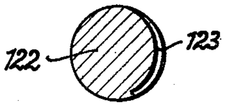

In the drawings:

Fig. 1 is a view in elevation of the improved carburetter, partly in section,

Fig. 2 is a side view corresponding to Fig. 1 taken in the direction of the arrow Y, Fig. 3 is a view of the cover of the carburetter, in a position similar to Fig. 2, Fig. 4 is a view of the carburetter casing of Fig. 2 in section on the line 4—4 of Fig. 1, Fig. 5 is a section on the line 5—5 of Fig. 4, Fig. 6 is a sectional elevation of the carburetter on the line 4—4 of Fig. 1, or again of Fig. 7 on the line 6—6, showing the device in the position of rest, that is to say with no fuel flowing therethrough, Fig. 7 is a section on the line 7—7 of Fig. 6, Fig. 8 is a view similar to Fig. 6 with the parts in the position corresponding to idling of the engine, Fig. 9 is a view corresponding to Fig. 6 with the parts in the position corresponding to full load conditions of the engine, Fig. 10 shows the carburetter cover detached, on the opposite side to the view of Fig. 3, Fig. 11 is a view of the vaporising nozzle spring detached, Fig. 12 is a view of the spring taken in the direction X of Fig. 11, Fig. 13 is an exploded view of the operating lever arrangement for the vaporising nozzle, Fig. 14 is a plan view of the operating lever of Fig. 13, taken in the direction of the arrow V, Fig. 15 is a view of the vaporising slide, partly in section, Fig. 16 is a side view corresponding to Fig. 15, partly in section, Fig. 17 is a view of the nozzle piston, partly in section, Fig. 18 is a section on the line 18—18 of Fig. 17, but on an enlarged scale, Fig. 19 shows a further form of the invention, in which the nozzle slide has a hand operated control for the fuel flow, Fig. 20 is a section on the line 20—20 of Fig. 19, Fig. 21 shows a further form of construction of the nozzle slide, on an enlarged scale, indicating the idling fuel groove and the main fuel groove, Fig. 22 is a section on the line 22—22 of Fig. 21, Fig. 23 is a section through the nozzle slide and the nozzle piston, on an enlarged scale, for giving an automatic control to the fuel flow, Fig. 24 shows diagrammatically, on an enlarged scale, a combination of the arrangements of Figs. 19 and 20 with the construction of Fig. 23, giving an automatic cut-off and control of the fuel flow, independent of the fuel level, Fig. 25 shows another form of construction of the device of the invention, in which the fuel control groove is formed in the guide surface and is adjusted by means of a spring, Fig. 26 shows an arrangement similar to that of Fig. 25, but with a needle adjustment, Fig. 27 is a section through the needle of Fig. 26 on the line O—P, but on an enlarged scale.

As shown, the carburetter is substantially egg-shaped. It consists of a casing 1 closed by a cover 2, which is held in position on the body 1 by means of a spring-bow 3. The spring-bow 3 has two ends 4, 5, bent up at right angles, to engage in holes 6, 7 in the casing 1, to swing about the axis thereby formed. It engages elastically in a groove 9 of the cover 2.

The casing 1 has at its lower part an internally threaded bore 10, into which a mixing nozzle 11 is screwed, which is preferably provided on its outer surface 12 (Fig. 5) with flats, so that it may be mounted in position or detached by means of a spanner. The lower edge 16 of an air filter 15 is carried on a shoulder 14 on the internal wall of the casing. The air nozzle 11 has a packing engagement with the lower edge 16 of the filter to prevent the entry of undesired air at this place. The bent ends 4, 5 of the bow, passing through the openings 6, 7, engage the lower edge 16 of the air filter 15 and lock it in position. When it should be desired to remove the air filter 15, the spring-bow 3 must be removed from engagement with the groove 9 and its turned up ends sprung out of the holes 6, 7, so that the filter 15 is released. The turned up ends 4, 5 can then be accommodated in the blind holes 18, 17, lying beneath the perforations 6, 7 (Figs. 1, 2 and 4).

The mixing nozzle 11 has, adjacent to the threading 10, radial slots 20 and a conical outer surface 19, which engages the inside of the annular flange 21 of the casing part or body of the carburetter, so that by screwing down the nozzle 11, the springy tongues 20 grip this flange 21 and thus the vaporiser body can be secured in any desired angular position on the flange 22, or at any time be released therefrom by turning in the opposite direction.

The casing cover 2 has ribs 24 or centering bars, on its outer surface, provided with notches 25 (Fig. 3), which fit into the flange 26 of the casing tightly, so that the cover 2 is accurately centered on the casing 1. As the periphery of the cover 2 is smaller than the inner diameter of the casing 1, an annular opening 27 is presented between the ribs 24 and the wall of the casing, through which air can pass (Fig. 7). The cover 2 is prevented from turning relatively to the casing 1 by the engagement of a projection 28 on it, which enters a recess 8 in the casing 1 (Fig. 1).

The conduit of fuel to the carburetter is effected by means of a nipple 29, which is screwed into a threaded boss 30 in the cover 2, and communicates with a cylindrical hollow space 31, in which is mounted a fuel filter 32. The nipple 29 extends into a recess 33 cast in the material of the cover 2, or disposed in a guide support 34 secured thereto, and is sealed against this by means of a packing ring 35. This conduit thus solely communicates with a passage 36 leading to an axial bore 37 in the guide part 34, in which bore a vaporising nozzle, consisting of a hollow nozzle sleeve 38, is axially displaceable. This nozzle sleeve has an axial bore 39, which at its upper end is expanded to form a shoulder 40, at the end of a spring chamber 41. A nozzle piston 42 is guided in the bore 39.

A compression spring 43 is disposed within the bore 37 of the guide part 34, which bears at one end on the inner end of the bore 37, and at the other end on the shoulder 40 of the spring chamber 41. At this end the spiral spring 43 is turned into a flat spiral 44, which bears against the upper part of the vaporiser piston 42 (Figs. 6, 7, 11 and 12). By adopting this construction, the spring 43, 44 serves two functions, as it presses down not only the nozzle slide 38, but also the nozzle piston 42.

The hollow cylindrical nozzle slide 38 (Figs. 15 and 16) has its lower sleeve surface extended at 45 in the form of a funnel, and at this part is provided with radial openings, or openings at an angle to the center, such, for instance as perforations 46. On its outer sleeve surface, the nozzle slide 38 is provided with a longitudinal groove 47 and an opening 48 at right angles to this groove 47. A bore 49 for the passage of fuel lies opposite to this opening 48, from which extends a fuel conduit groove 50 on the outer sleeve surface of the nozzle sleeve, the cross-section of which expands uniformly upwards.

The nozzle piston 42 has on its upper end a lateral notch 51. Further, it has on the opposite side a fuel conduit 52 which opens at right angles into a central fuel channel 53, which is extended axially downwards and leads to the outside of a downwardly expanded part of the nozzle piston 42, in the form of a mushroom shaped boss 54. The sleeve of the nozzle piston 42 is provided, above the mushroom headed boss 54, with inclined grooves 55, and is provided in these grooves 55 with radial passages 56, which open out into the central fuel conduit 53.

The vaporising nozzle, consisting of the nozzle slide 38 and of the nozzle piston 42 mounted on it, is mounted to be axially displaceable in the bore 37 of the guide support 34 of the cover 2, as may be seen from Figs. 3 and 10, and extends into the periphery of the air filter 15 and mixing nozzle 11 of the casing 1.

The displacement of the nozzle slide 38 and of the nozzle piston 42 is effected by a control pawl 57, the end 58 of which, bent to form a controlling cam, passes through a slot 59 of the guide support 34, into a notch 48 of the nozzle slide 38. Its free end 61 engages in the notch 51 of the nozzle piston 42. By reason of the pressure of the combined springs 43, 44, the nozzle slide 38 and the nozzle piston 42 are linked together in permanent connection with the control pawl 57. The control pawl 57 is mounted on a control lever 62 formed as a bell crank lever, which latter has a spindle 63 revolubly mounted in a bore in the supporting guide part 34 at right angles to the axis of the bore 37. A tension cable 65 is attached to one arm 64 of the control lever 62, which passes into the cover 2 through a nipple 66 (Fig. 3). The pressure of the combined springs 43, 44 maintains a tensioned connection between the cable 65 and the control lever 62 in the position of rest.

A second tension cable 69 passes through a nipple 68 into the cover 2, and serves to operate a control lever 70 by turning the nozzle slide 38 about its longitudinal axis. This cable 69 is connected to the arm 71 of the control lever 70, which is formed as a bell crank lever. The control lever 70 (Figs. 13 and 14) is provided on one side with a bearing hole 72, into which the free end 73 of the spindle 63 of the control lever 62 extends, and has a bow part 74 which, by means of an eyelet 75, is pivotally mounted on the collar 76 of the spindle 63. The free end 73 of the spindle 63 is enlarged in the form of a button or the like, which, together with the spring plate 77, secures the control lever 70. A guide pin 78 is further mounted on the control lever 70 which passes through the cam slot 79 of the guide support part 34, and engages in the longitudinal groove 47 of the nozzle slide 38 (Fig. 10).

When tension is applied to the cable 69, the arm 71 of the control lever 70 is displaced about the axis of the spindle 63 in the direction of the arrow U, from the position shown in Fig. 10, so that the guide pin 78 is lifted, which slides in the cam slot 79 of the guide support part 34, to apply a lateral pressure to the longitudinal groove 47 on the nozzle slide 38, and turn this about its axis.

By applying a tension to the cable 65, the arm 64 is displaced, and with it the control lever 62, about the axis of the spindle 63, causing the control pawl 57, with its bent end 58, to be lifted, and thereby causing the displacement of the nozzle slide 38, which lies with the upper surface of the notch 48, due to spring pressure 43, always against the upper edge of the controlling cam formed by the bent end 58. The nozzle piston 42 also moves upwardly in the guide part 34 under action of the spiral spring 44. Further tension on the cable 65 causes the upper edge of the control cam 58 of the pawl 57 to leave the upper edge of the notch 48, so that its free end 61, which extends into the notch 51 of the nozzle piston 42, is correspondingly reduced in length. In measure as the upper surface of the notch 51 on the nozzle piston 42 is maintained always by the pressure of the spiral spring 44 in engagement with the free end 61 of the control pawl 57, the nozzle piston 44 is moved relatively to the nozzle slide 38 out of this, so that the mushroom headed knob 54 of the nozzle piston 42 is displaced from the conically shaped flange 45 of the nozzle slide 38, and an annular space is formed between these two parts, the cross-section of which progressively increases as the nozzle slide 38 is lifted.

In the position of rest, the individual parts of the vaporiser nozzle are in the position shown in Fig. 6. The nozzle piston 42 closes, by means of its mushroom head 54, the conical opening 45 of the nozzle slide 38 which lies in the narrowest part of the mixing nozzle 11 and of the support 21, and closes passage through this. As may further be seen from Fig. 6, the conduit opening 36 for the passage of fuel is closed by the nozzle slide 38, so that the flow of fuel is shut off, but it is of importance that the nozzle slide 38 is pressed by the bent end 61 of the control pawl 57 against the wall of the guide bore piece 37 lying opposite the fuel opening, so that this is always sealed, which sealing may be further effected by means of a laterally acting spring.

Should now tension be applied to the cable 65, then the control lever 62 is displaced, and with it the control pawl 57 is lowered with its control cam part 58, by reason of the pressure of the spring 43 acting against the shoulder 40 of the nozzle slide 38, so that the upper surface of the notch 48 is linked to it and the nozzle slide 38 will, for instance, be lifted into the position shown in Fig. 8. The conically shaped flange 45, the opening of which is still closed by the mushroom head 54 on the nozzle piston, still lies opposite the narrowest cross-section of the mixing nozzle opening 11, so that this remains closed. At the same time, however, the nozzle slide 38 is lifted to such an extent that the fuel conduit groove 50 at its narrower part is in communication with the fuel conduit opening 36. The fuel may therefore leave the fuel conduit at a low rate of flow through the fuel nipple 29, the hollow space 31, the fuel filter 32, the fuel opening 36 in the guide support part 34, and the fuel groove 50, and thence through the fuel bore 49 of the nozzle slide 38 into the lateral fuel bore 52 of the nozzle piston 42, and from thence into the central fuel passage 53, and out on to the outer surface of the mushroom headed knob 54 at the point 60.

By reason of the suction action of the internal combustion engine connected to a carburetter of this type, air will be drawn in through the support 21 of the connecting flange 22. By reason of the reduced pressure, the atmospheric air passes through the annular opening 27 into the carburetter casing, flows through the air filter 15, and comes into the annular space between the mixing nozzle 11 and the vaporiser nozzle of the nozzle slide 38, and then, as the conically shaped part 45 of the nozzle slide closes the free cross-section of the air nozzle 11, it will pass through the radial openings 46 of the nozzle slide 38 down along the inclined grooves 55 into the opening underneath the grooves 55, and from there through the radial channels 56 into the central fuel channel, where it mixes with the fuel stream moving at right angles to the air stream, and produces at the opening 60 a homogeneous mixture, which then passes into the combustion space of the internal combustion engine.

This is the idling position for the carburetter according to the invention, in which the parts take up the position shown in Fig. 8. As an ignitable mixture is immediately formed by the reduction in pressure at the opening 60 of the support part 21, the engine immediately starts, without requiring a float to be immersed by a set amount, or without requiring the use of a special supporting nozzle.

If the cable 65 is further tensioned, then the nozzle slide 38 is correspondingly lifted, so that the fuel groove 50 is displaced in front of the fuel opening 36 with an increasing cross-section, and the size of passage for the fuel is consequently increased. The conical flange 45 of the nozzle slide 38 now passes into the nozzle-shaped extension of the mixing nozzle 11, so that between the inner wall of the mixing nozzle 11 and the conically shaped flange 45, an annular space 81 is formed, as shown in Fig. 9, and the atmospheric air can be sucked in in the direction of the arrow T (Fig. 9) into the mixing chamber 11.

At the same time, the control cam part 58 of the control pawl 57 has moved over the edge of the notch 48 of the nozzle slide 38, so that its free end 61 is reduced in length and the nozzle piston 42 is axially displaced out of the nozzle slide 38 by the pressure of the spiral spring 44, so that the mushroom head 54 is displaced away from the conically shaped flange 45, and an annular space 80 is formed therebetween, through which the air stream passes in a vertical direction, and, due to the nozzle action, draws fuel from the central channel 53, so that this fuel passes from the radial channel 56 into the expanded part between the mushroom head 54 and the conically shaped flange 45, and is finely atomised in the annular space 80. At the same time, a small quantity of air passes through the radial openings 46, is whirled round by the inclined grooves 55, and mixes with the fuel in the annular space 80 to form an initial mixture which is converted, as it passes into the air stream moving past it, into a homogeneous air suspension mixture.

The carburetter of this invention works in this manner from the position of rest, thence through the idling position to a full load position smoothly, without interruption, so that a continuous control is possible. Various widths may be given to the groove in the guide piece, and various sizes of bore may be used in the nozzle slide. A particular advantage of the invention is the elimination of a float, so that the carburetter may operate in any position and give a smooth control to the flow of fuel and of fresh air by suitable positioning of the nozzle slide 38 and the nozzle piston 42, so that no special starting jet arrangement and idling jet arrangement is necessary.

For any given position of the nozzle slide 38 and the nozzle piston 42, the ratio of fuel to air can be controlled by means of the cable 69, in that the nozzle slide 38 is turned slightly with the nozzle piston 42 about its longitudinal axis, and thus alters the lateral position of the fuel supply groove 50 relatively to the fuel opening 36, so that this latter is wholly or partly masked by the fuel conduit groove 50. Instead of providing a conduit groove 50, a number of fuel conduit grooves may be disposed parallel to one another and provided with a corresponding bore 49, so that the nozzle slide 38 moves in corresponding guides in the guide piece 34, and can be turned into a position to correspond to the desired cross-section of fuel conduit groove. By this means it is possible to alter the ratio of fuel supply to air supply which, for instance, is useful when applying the carburetter to various types of engine, or to make the necessary adjustment for pressure variations and temperature variations of the outer atmosphere, or again when operating with various forms of carburetter fuel.

As shown on an enlarged scale in Figs. 19 and 20, the nozzle slide 38, having the fuel groove 50 and the fuel conduit bore 49, may be provided on both sides of the groove 50 with a ground packing surface 81, against which a regulating pin 82 may slide with its rear surface held by spring pressure tightly thereagainst, which pin 82 is revoluble about its axis, and which has a fuel passage 83 eccentric to its axis, the opening of which is more or less masked by the fuel groove 50 according as the regulating pin 82 is turned, and this can either be wholly uncovered, partly uncovered, or wholly covered. The fuel is then led through a fuel passage 84. The desired quantity of fuel passes in the described manner through the fuel bore 49 into the lateral fuel bore 52, and thence into the central fuel passage 53 of the nozzle piston 42, and into the mixing chamber.

As shown in Figs. 21 and 22, instead of providing a fuel groove 50, an idling fuel groove 86 and a main fuel groove 87 may be provided, which open out into the same fuel bore 49. Adjustment screws 88 and 89 respectively, pass into the fuel grooves 86 and 87, these adjustment screws being under the action of a spring 90. By adjusting the screws 88 and 89, the cross-section of the grooves 86 and 87 can be varied in size, and thus the flow of fuel therethrough. By this arrangement, the quantity of fuel used in idling can be adjusted independently of the main quantity of fuel flow. Further, the quantity of fuel flowing can be adjusted by altering the free cross-section of the fuel grooves, for instance by means of an adjustable plate which can be bent to a desired degree, or by moving the side wall of the fuel groove 49 either towards or away from the nozzle slide 38 by means of a rotary sleeve.

In many cases it is desirable to automatically shut off the flow of fuel. This may be effected as shown in Fig. 23, in that the nozzle piston 42, in addition to the central fuel passage 53, has also an air passage 91 disposed parallel to it, which leads into a bore in an air conduit groove 92 in the outer surface of the nozzle slide 38 which is in connection with an air passage 93 which leads into a tubular spring body 94, which at its free end carries a valve pin 95 which is adapted to close upon a valve seat 97 in the closure part 99. In this case 96 shows a fuel filter, and 98 an annular groove, which are in communication with the aforementioned fuel grooves by way of the lateral fuel bore 52 in the nozzle piston 42. In the position of rest, as shown in Fig. 23, the valve 97 is closed and the flow of fuel shut off. Immediately the engine is started up, a reduction of pressure takes place in the suction support and the mixing nozzle 11, and is further set up in the air channel 91 by connection through the air groove 92 in the annular spring body 94, the spring tension of which is so selected that it contracts, due to the reduction in pressure, and thus lifts the valve pin away from the valve seat 97 and allows free flow of fuel from the fuel conduit 100 through the filter 96 in the annular groove 98, and through the lateral fuel passage of the nozzle piston 42 into the central fuel passage 53.

In Fig. 24, a combination of the arrangements of Figs. 19 and 20 and of Fig. 23 is shown, in which variations in pressure in the fuel flow can be damped out, as may, for instance, be the case where the fuel flows from fuel reservoirs lying at a higher level than the carburetter, by reason of the static head which will alter as the level of fuel in the container sinks. Similarly, variations in pressure, which may be due to fuel pumps, can be damped out or converted to a constant value.

The nozzle slide 38 has, similarly to the construction shown in Figs. 19 and 20, a fuel conduit 50 which lies against a sealing surface 81, against which the rear side of the regulating pin 101 rests, so that the fuel bore 102 is more or less brought into coincidence with the fuel groove 50. The regulating pin 101 carries a lever arm 103 which, at its free ends, has two adjustment screws 104 and 108, each engaging into a threaded sleeve. The free end of the adjustment screw 104 is secured into the base 105 of a spring tubular suction body 106, while the adjustment screw 108 abuts against the base 109 of a spring tubular fuel body 110. The inside of the annular spring body 106 is in communication with a conduit 107, which is in communication either with the suction manifold of the engine or with the reduction in pressure arm of the carburetter, while the annular spring body 110 communicates with a passage 111 leading to the main fuel supply conduit.

When the engine is started up, a reduction of pressure is caused in the suction support, in the passage 107 and inside the annular spring body 106, so that the lever arm is displaced upwardly from the position shown in Fig. 24, and the fuel supply bore 102 is turned relatively to the open cross-section of the fuel groove 50, so that the fuel, as shown in Figs. 19 and 20, may flow through the nozzle slide 38 into the mixing nozzle 11 at a greater or lesser rate. The degree of displacement of the lever arm 103 is set by the adjustment of the annular tubular body 110, the base 109 of which forms an abutment for the adjustment screw 108, dependent on the height of fuel level, so that the flow of fuel is always constant. The sensitivity of the spring body 110 and the length of the adjustment screws is so selected that the spring body corresponds to differences in pressure caused by alteration in the level of fuel supply, for instance by a full or partly empty fuel reservoir. By adjusting the adjustment screw 108, the fuel flow can be controlled independently of the static head of fuel supply, while, by adjusting the set-screw 104, the fuel flow can be more or less shut off from the maximum opening of the fuel bore 102.

The fuel groove, as shown in Fig. 25, may be formed as an extension 112 of the guide support part 34 opening into the fuel conduit 115 instead of being disposed in the outer surface of the nozzle slide 38. A movable base 114 is disposed in this fuel groove 112 which is under pressure of a leaf spring 115, which rests against the ends of the adjustment screws 116, 117, so that it is possible to alter the inclined position of the base-plate 114 and the effective cross-section of the groove 112 by adjusting the screws 116 and 117. The adjustment screw 117 then acts as an idling adjustment screw, while the screw 116 serves for adjusting the remaining range of gas supplied up to full load. The base-plate 114 and/or the spring 115 are so selected in size that they close off the cross-section of the fuel groove 112. The fuel passes from the fuel groove 112 in the manner described above, through the bores 52 and 53 of the nozzle piston 42.

Fig. 26 shows another form of construction of fuel conduit, in which the guide support part 34 is axially displaceable in known manner in the nozzle slide 38. Also in this case the wall of the guide support part 34 has a fuel groove 118 similar to that shown in Fig. 25, which is fed with fuel from the bore 36 and which may be placed in communication with a radial bore 119 of the fuel slide 38, which has a central bore 120 into which a needle guide sleeve 121 extends, the free cross-section of which is occupied by a needle 122 having a lateral groove 123, which may be placed in communication with the bore 119, as shown in Fig. 27, and varies laterally in cross-section, so that by displacing the nozzle sleeve 38 axially, or by turning the nozzle sleeve 38 about its axis, an extension or contraction of cross-section of the groove 123, and thereby a control of the free flow of fuel, can be produced.

These constructions are only given by way of example, as showing various possibilities of construction. The needle 122 may be axially displaceable relatively to the nozzle slide 38, or to the nozzle piston. Further, the fuel supply can be led in centrally to the needle 122.

A special advantage of the carburetter of this invention is that the quantity of fuel is itself controlled by the nozzle. Consequently, special control elements such as throttle valves and the like are not necessary, so that the suspension of fuel in air has not variations of direction imposed on it, and separation of molecules of fuel from the carrier air stream is avoided. Further, the carburetter of this invention may be used for producing other forms of suspensions of liquid particles in air for the mixing and vaporisation of pest destroying liquids, paints, varnishes and the like.

We claim:

1. A vaporizer for liquids under pressure, comprising, in combination, a hollow body member having an air passage way extending in one axial direction, said body member having an inner surface portion and being formed with a conduit opening on said surface portion and adapted to admit a liquid; a nozzle member mounted in said hollow body member for rectilinear movement in said axial direction and having an outer surface portion slidably engaging said inner surface portion and a nozzle end portion projecting into said air passage, said nozzle member being formed with a conduit opening on said outer surface portion and on said nozzle end portion, one of said surface portions being formed with an elongated groove of gradually increasing cross-section extending in said axial direction and communicating at the wider end thereof with the conduit opening on said one surface portion, said groove passing during movement of said nozzle member over the other of said conduits so that said conduits communicate through groove portions of varying cross-section; and manually operated means for moving said nozzle member in said axial direction whereby the amount of liquid passing through said conduits and said groove to said nozzle end portion is adjusted.

2. A vaporizer for liquids under pressure, comprising, in combination, a hollow body member having an air passageway extending in one axial direction, said body member having an inner surface portion and being formed with a conduit opening on said surface portion and adapted to admit a liquid; a nozzle sleeve mounted in said hollow body member for rectilinear movement in said axial direction and having an outer surface portion slidably engaging said inner surface portion and a nozzle end portion projecting into said air passage, said nozzle sleeve being formed with a conduit opening on said outer surface portion and on the inner surface of said nozzle sleeve, said outer surface portion being formed with an elongated groove of gradually increasing cross-section extending in said axial direction and communicating at the wide end thereof with the conduit opening on said outer surface portion, said groove passing during movement of said nozzle member over the other of said conduits so that said conduits communicate through groove portions of varying cross-section; a nozzle piston in said nozzle sleeve and being formed with an outlet conduit communicating with said conduit in said nozzle sleeve, said nozzle piston having a piston end portion projecting into said air passage and forming together with said nozzle end portion an annular outlet communicating with said outlet conduit; and manually operated movable means including a member engaging said nozzle sleeve and said nozzle piston for moving said nozzle sleeve and said nozzle piston together in said axial direction whereby the amount of liquid passing through said conduits to said annular outlet is adjusted.

3. A vaporizer for liquids under pressure, comprising, in combination, a hollow body member having an air passageway extending in one axial direction, said air passageway having a widened flaring portion, said body member having an inner surface portion and being formed with a conduit opening on said surface portion and adapted to admit a liquid; a nozzle sleeve mounted in said hollow body member for rectilinear movement in said axial direction and having an outer surface portion liquid-tightly engaging said inner surface portion and a nozzle end portion projecting into said air passage, said nozzle sleeve being formed with a conduit opening on said outer surface portion and on the inner surface of said nozzle sleeve, one of said surface portions being formed with an elongated groove of gradually increasing cross-section extending in said axial direction and communicating at the wider end thereof with the conduit opening on said one surface portion, said groove passing during movement of said nozzle member over the other of said conduits so that said conduits communicate through groove portions of varying cross-section; a nozzle piston slidable in said nozzle sleeve in said axial direction and being formed with an outlet conduit communicating with said conduit in said nozzle sleeve, said nozzle piston having a piston end portion projecting into said air passage and forming together with said nozzle end portion an annular outlet communicating with said outlet conduit; and manually operated movable means including a cam member engaging said nozzle sleeve and said nozzle piston for moving said nozzle sleeve and said nozzle piston together in said axial direction whereby the amount of liquid passing through said conduits to said annular outlet is adjusted, said manually operated means simultaneously moving said cam member and producing a relative movement between said nozzle piston and said nozzle sleeve for increasing the cross-section of said annular outlet, said end portions of said nozzle sleeve and of said nozzle piston moving into said flaring portion of said air passage when said cam means increase the cross-section of said outlet and when said conduits communicate through a portion of said groove of greater cross-section.

4. A vaporizer for liquids under pressure, comprising, in combination, a hollow body member having an air passageway extending in one axial direction, said body member having an inner surface portion and being formed with a conduit opening on said surface portion and adapted to admit a liquid; a nozzle sleeve mounted in said hollow body member for rectilinear movement in said axial direction and having an outer surface portion liquid-tightly engaging said inner surface portion and a nozzle end portion projecting into said air passage, said nozzle sleeve being formed with a conduit opening on said outer surface portion and on the inner surface of said nozzle sleeve, one of said surface portions being formed with an elongated groove of gradually increasing cross-section extending in said axial direction and communicating at the wide end thereof with the conduit opening on said one surface portion, said groove passing during movement of said nozzle member over the other of said conduits so that said conduits communicate through groove portions of varying cross-section, said nozzle sleeve having an axial slot; a nozzle piston slidable in said nozzle sleeve in said axial direction and being formed with an outlet conduit communicating with said conduit in said nozzle sleeve, said nozzle piston having a piston end portion projecting into said air passage and forming together with said nozzle end portion an annular outlet communicating with said outlet conduit, said piston being formed with a recess registering with said slot in said nozzle sleeve; manually operated means including a pivoted link having a cam portion passing through said slot into said recess and engaging said nozzle sleeve and said nozzle piston, said manually operated means being movable in axial direction for moving said nozzle sleeve and said nozzle piston in said axial direction and including means for simultaneously pivoting said pivoted link, said cam portion producing during pivoting of said link a relative movement between said nozzle piston and said nozzle sleeve for increasing the cross section of said annular outlet; and resilient means mounted in said body member and urging said sleeve and said piston into engagement with said cam portion of said link.

5. A vaporizer as claimed in claim 1 wherein said hollow body member includes a mixture sleeve having a tubular inner surface having a widened flaring portion forming a part of said air passageway.

6. A vaporizer for liquids under pressure, comprising, in combination, a hollow body member having an air passageway extending in one axial direction, said air passageway having a widened flaring portion, said body member having an inner surface portion and being formed with a conduit opening on said surface portion and adapted to admit a liquid; a nozzle sleeve mounted in said hollow body member for rectilinear movement in said axial direction and having an outer surface portion liquid-tightly engaging said inner surface portion and a widely flaring conical nozzle end portion projecting into said air passage, said nozzle sleeve being formed with a conduit opening on said outer surface portion and on the inner surface of said nozzle sleeve, one of said surface portions being formed with an elongated groove of gradually increasing cross-section extending in said axial direction and communicating at the wider end thereof with the conduit opening on said one surface portion, said groove passing during movement of said nozzle member over the other of said conduits so that said conduits communicate through groove portions of varying cross-section; a nozzle piston slidable in said nozzle sleeve in said axial direction and being formed with an outlet conduit communicating with said conduit in said nozzle sleeve, said nozzle piston having a mushroom-shaped piston end portion projecting into said air passage and forming together with said widely flaring conical nozzle end portion an annular outlet communicating with said outlet conduit; and manually operated movable means including a cam member engaging said nozzle sleeve and said nozzle piston for moving said nozzle sleeve and said nozzle piston together in said axial direction whereby the amount of liquid passing through said conduits to said annular outlet is adjusted, said manually operated means simultaneously moving said cam member and producing a relative movement between said nozzle piston and said nozzle sleeve for increasing the cross-section of said annular outlet, said end portions of said nozzle sleeve and of said nozzle piston moving into said flaring portion of said air passage when said cam means increase the cross-section of said outlet and when said conduits communicate through a portion of said groove of greater cross-section.

7. A vaporizer as claimed in claim 6 wherein said flaring conical nozzle end portion is formed with transverse air passages communicating with said annular outlet between said nozzle end portion and said mushroom-shaped piston end portion.

8. A vaporizer as claimed in claim 1 and including adjusting means cooperating with said conduit in said body member for adjusting the cross section of said conduit whereby the amount of fuel passing through said conduit is adjusted.

9. A vaporizer as claimed in claim 1 wherein said body member includes a detachable cap portion; an air filter located in said air passageway surrounding said nozzle member; a spring bow having a central arcuate portion resiliently engaging the outer surface of said cap portion and two inwardly bent end portions; and wherein said body member is formed with two diametrically arranged bores passing from said air passageway to the outer surface of said body member, said inwardly bent end portions of said spring bow passing through said bores and engaging and holding said air filter.

10. A vaporizer as claimed in claim 9 and wherein said cap portion is formed with a groove engaging said central portion of said spring bow for retaining the same in a position resiliently holding said cap portion.

11. A vaporizer as claimed in claim 9 and including spacing means between said cap portion and said body member and defining air channels communicating with said air passage in said body member.

12. A vaporizer for liquids under pressure comprising, in combination, a hollow body member having an air passageway extending in one axial direction, said air passageway having a widened flaring portion, said body member having an inner surface portion and being formed with a conduit opening on said surface portion and adapted to admit a liquid; a closure pin for said conduit in said body member; means responsive to reduction of pressure within said body member to operate said pin; a nozzle sleeve mounted in said hollow body member for rectilinear movement in said axial direction and having an outer surface portion liquid-tightly engaging said inner surface portion and a nozzle end portion projecting into said air passage, said nozzle sleeve being formed with a conduit opening on said outer surface portion and on the inner surface of said nozzle sleeve, one of said surface portions being formed with an elongated groove of gradually increasing cross-section extending in said axial direction and communicating at the wider end thereof with the conduit opening on said one surface portion, said groove passing during movement of said nozzle member over the other of said conduits so that said conduits communicate through groove portions of varying cross-section; a nozzle piston slidable in said nozzle sleeve in said axial direction and being formed with an outlet conduit communicating with said conduit in said nozzle sleeve, said nozzle piston having a piston end portion projecting into said air passage and forming together with said nozzle end portion an annular outlet communicating with said outlet conduit; and manually operated movable means including a cam member engaging said nozzle sleeve and said nozzle piston for moving said nozzle sleeve and said nozzle piston together in said axial direction whereby the amount of liquid passing through said conduits to said annular outlet is adjusted, said manually operated means simultaneously moving said cam member and producing a relative movement between said nozzle piston and said nozzle sleeve for increasing the cross-section of said annular outlet, said end portions of said nozzle sleeve and of said nozzle piston moving into said flaring portion of said air passage when said cam means increase the cross-section of said outlet and when said conduits communicate through a portion of said groove of greater cross-section.

13. A vaporizer as claimed in claim 12 wherein said pressure responsive means is a contractile helical spring.

14. A vaporizer as claimed in claim 1 and including means for turning said nozzle member about its axis for changing the cross section through which said groove and said conduits communicate.

15. A vaporizer for liquids under pressure, comprising, in combination, a hollow body member having an air passageway extending in one axial direction, said air passageway having a widened flaring portion, said body member having an inner surface portion and being formed with a conduit opening on said surface portion and adapted to admit a liquid; a nozzle sleeve mounted in said hollow body member for rectilinear movement in said axial direction and having an outer surface portion liquid-tightly engaging said inner surface portion and a widely flaring conical nozzle end portion projecting into said air passage, said nozzle sleeve being formed with a conduit opening on said outer surface portion and on the inner surface of said nozzle sleeve, said outer surface portion of said nozzle sleeve being formed with an elongated groove of gradually increasing cross-section extending in said axial direction and communicating at the wider end thereof with the conduit opening on said outer surface portion of said nozzle sleeve, said groove passing during movement of said nozzle sleeve over said conduit in said body member so that said conduits communicate through groove portions of varying cross-section, said nozzle sleeve having an axial slot; a nozzle piston slidable in said nozzle sleeve in said axial direction and being formed with an outlet conduit communicating with said conduit in said nozzle sleeve, said nozzle piston having a mushroom-shaped piston end portion projecting into said air passage and forming together with said widely flaring conical nozzle end portion an annular outlet communicating with said outlet conduit, said piston being formed with a recess registering with said slot in said nozzle sleeve; manually operated means including a pivoted link having a cam portion passing through said slot into said recess and engaging said nozzle sleeve and said nozzle piston, said manually operated means being movable in axial direection for moving said sleeve and said piston, and including means for simultaneously pivoting said pivoted link, said cam portion effecting during pivoting of said link a relative movement between said nozzle piston and said nozzle sleeve for increasing the cross section of said annular outlet, said end portion of said nozzle sleeve and of said nozzle piston moving into said flaring portion of said air passage while said cam portion increases the cross section of said annular outlet; and resilient means mounted in said body member and urging said sleeve and said piston into engagement with said cam portion of said link.

16. A vaporizer for liquids as claimed in claim 1 wherein said groove is located on said outer surface portion of said nozzle member and communicates at said wider end thereof with said conduit in said nozzle member, and wherein said groove passes during movement of said nozzle member over said conduit in said body member.

17. A vaporizer as claimed in claim 16 and including resilient means mounted in said body member engaging said nozzle member and urging the same to move in one axial direction for moving said nozzle member into a position in which portions of said groove of narrower cross section communicate with said conduit in said body member; and wherein said manually operated means move said nozzle member in the opposite axial direction against the action of said resilient means for moving said nozzle member into a position in which portions of said groove of wider cross section communicate with said conduit in said body member.

18. A vaporizer as claimed in claim 1 wherein said nozzle end portion is formed with an annular outlet into which said conduit in said nozzle member opens.

19. A vaporizer as claimed in claim 18 wherein said nozzle end portion is also formed with at least one transverse air passage communicating with said annular outlet.

20. A vaporizer as claimed in claim 1 wherein said nozzle end portion is mushroom-shaped and formed with an annular outlet into which said conduit in said nozzle member opens.

21. A vaporizer as claimed in claim 1 wherein said air passageway has a wider flaring portion in which said end portion of said nozzle member is located when said wider end of said groove communicates with said other of said conduits during movement of said nozzle member.

22. A vaporizer as claimed in claim 21 wherein said end portion of said nozzle member is formed with an annular outlet into which said conduit in said nozzle member opens, and also formed with transverse air passages communicating with said annular outlet.

23. A vaporizer as claimed in claim 1 and including resilient means mounted in said body member engaging said nozzle member and urging the same to move in one axial direction; and wherein said manually operated means move said nozzle member in the opposite axial direction against the action of said resilient means.

References Cited in the file of this patent

UNITED STATES PATENTS

| | | |
|---|---|---|
| 1,125,069 | Coulter | Jan. 19, 1915 |
| 1,159,851 | McCurdy | Nov. 9, 1915 |
| 1,580,905 | Kogstrom | Apr. 13, 1926 |
| 1,818,928 | Kreher | Aug. 11, 1931 |
| 1,945,180 | Carter | Jan. 30, 1934 |
| 1,990,702 | Leibing | Feb. 12, 1935 |
| 2,544,289 | Andrews | Mar. 6, 1951 |
| 2,564,113 | Kittler | Aug. 14, 1951 |
| 2,630,304 | Rivoche | Mar. 3, 1953 |